United States Patent [19]
Woodruff

[11] Patent Number: 5,901,496
[45] Date of Patent: May 11, 1999

[54] TERMITICIDE BAIT TUBE FOR IN GROUND APPLICATION

[75] Inventor: Keith F. Woodruff, Mountainside, N.J.

[73] Assignee: American Cyanamid Company, Madison, N.J.

[21] Appl. No.: 08/771,578

[22] Filed: Dec. 20, 1996

[51] Int. Cl.⁶ .............................. A01M 1/00; A01M 1/20
[52] U.S. Cl. ................................................ 43/124; 43/131
[58] Field of Search .......................... 43/124, 131, 132.1; 47/48.5 G; 239/276

[56] References Cited

U.S. PATENT DOCUMENTS

| | | |
|---|---|---|
| 1,982,974 | 12/1934 | Aiken . |
| 2,082,712 | 6/1937 | McIvor ...................................... 43/131 |
| 2,970,348 | 2/1961 | Imus et al. ................................ 43/131 |
| 3,624,953 | 12/1971 | Crosby . |
| 3,821,863 | 7/1974 | Chan ........................................ 47/48.5 |
| 3,900,962 | 8/1975 | Chan ........................................ 47/48.5 |
| 4,361,983 | 12/1982 | Wilson . |
| 4,866,880 | 9/1989 | Weinblatt ................................. 47/48.5 |
| 5,329,726 | 7/1994 | Thorne et al. ............................ 43/124 |
| 5,443,641 | 8/1995 | Helsing et al. . |
| 5,555,672 | 9/1996 | Thorne et al. . |
| 5,620,516 | 4/1997 | Helsing et al. ........................... 47/48.5 |

*Primary Examiner*—Michael J. Carone
*Assistant Examiner*—Darren Ark
*Attorney, Agent, or Firm*—Mark P. Stone

[57] ABSTRACT

An in ground termiticide bait tube device for insect detection and control includes a first outer housing tube fixedly implanted into the ground and a second inner tube removably receivable within the outer housing. The inner tube contains bait for detecting and controlling termite activity, and can be inspected or replaced by removing the inner tube from the outer tube. The inner tube is mounted within the outer tube by rotation along a lead thread such that maximum relative rotation assures alignment of openings in the inner and outer tubes. The device further includes a flexible cap to provide tampering resistance when the inner and outer tubes are installed below ground. The cap is designed to cooperate with the outer tube to oppose rotational movement of the cap and inner tube in a direction resulting in the removal of the inner tube from the outer tube when the device is in an operational state. Support elements are provided to improve the alignment of the openings in the inner and outer tubes, and to increase structural support at the area of which the inner and outer tubes are rotated into engagement.

18 Claims, 10 Drawing Sheets

TERMITICIDE BAIT TUBE FOR IN GROUND APPLICATION

BACKGROUND OF THE INVENTION

The present invention is directed to methods and apparatus for detecting and controlling termite activity by bait containing devices implanted in ground.

U.S. Pat. No. 5,329,726 discloses a system for termite detection and control including embodiments of the invention in which a bait cartridge is removably received within a housing implanted into the ground. A non-toxic bait material is provided within the cartridge for periodic removal from the housing for inspection for termite activity. If termite activity is present, the original bait material is replaced with a toxicant for controlling the termite activity. Openings in the permanently implanted housing permit access by the termites to the material within the housing, and maintain passageways established in the ground by the termites in alignment with the openings in the housing to assure that the termites will be guided to the openings. The disclosure of U.S. Pat. No. 5,329,726 is expressly incorporated by reference herein.

Pending U.S. Ser. No. 08/480,579, designating the present inventor and being commonly owned with the present application, was filed on Jun. 7, 1995 and is entitled "Termiticide Bait Tube For In Ground Application". The subject matter of the present invention is directed to modifications of the methods and apparatus disclosed and claimed in said pending patent application. Applicant expressly incorporates by reference herein the disclosure of U.S. patent application Ser. No. 08/480,579, filed on Jun. 7, 1995, in its entirety.

It is an object of the present invention to provide improved in ground devices for monitoring and controlling termite activity including an apertured outer housing permanently implanted in ground, and a bait-containing inner housing removably received within the outer housing and threadably coupled thereto for monitoring and controlling termite activity, and assuring that openings in the inner and outer housings will maintain alignment.

It is a further object of the present invention to provide a device of the aforementioned type including an improved, removable, flexible cover for providing resistance to tampering with the device when installed in ground.

It is a further object of the present invention to modify the embodiments of the termiticide device disclosed in the aforementioned U.S. patent application Ser. No. 08/489,579 by eliminating a metering cup, and providing additional structural elements for enhancing the resistivity of the cover to tampering, for enhancing the structural integrity of the device at the area at which the inner tube engages the outer tube, and for providing structure to facilitate relative rotation of the inner and outer tubes to assure substantial alignment of the corresponding openings defined therein.

Other objects, features, and advantages of the present invention will become apparent from the following discussion.

SUMMARY OF THE INVENTION

A device for monitoring and controlling termite activity includes a first outer housing adapted to be permanently implanted in ground. The outer housing is of a generally tubular shape, and defines at least one opening in the outer surface thereof for permitting access by termites therein. At least one projection extends radially outwardly from the outer surface of the outer housing to prevent the outer housing from rotating after it is implanted in ground. An inner housing defining at least one opening comprises a bait tube generally conforming to the configuration of the outer housing and is removably received within the outer housing. The inner and outer tubes are removably coupled together by threading, and are operatively arranged and movable relative to each other such that maximum rotation of the inner tube relative to the outer tube in a predetermined direction assures that the openings defined in the outer tube are aligned with the openings defined in the inner tube. In this manner, the inner tube is securely received within the outer tube when the device is in its operative position, and alignment of the openings in the inner and outer tubes upon removal and replacement of the inner tube, is automatically achieved by rotating the inner tube a maximum angular distance relative to the outer tube.

The bottom end of the outer tube is pointed to facilitate driving thereof into the ground, openings are provided in the inner and outer tubes to permit drainage of excess water that might otherwise accumulate in the bait material within the inner housing, and the clearance between the outer surface of the inner tube and the inner surface of the outer tube is reduced by bosses provided around the openings defined in the inner tube to provide a continuous passageway between corresponding aligned openings in the respective tubes.

The device includes a flexible cover having a center portion removably mounted to the top of the device to prevent access to the bait material in the inner tube. The cover includes a peripheral portion received in a recess defined in a flange extending radially outwardly from the upper end of the outer housing. At least one raised rib extends upwardly from the flange extending radially outwardly from the outer housing to provide structural support for preventing the cover from flexing downwardly when mounted to the device. The lower surface of the cover, when mounted to the device, includes at least one element extending downwardly therefrom in radial alignment with the rib extending upwardly from the flange of the outer housing. The downwardly extending element is designed and arranged to cooperate with the rib so that rotation of the cover relative to the outer housing is permitted only in a predetermined direction (clockwise or counterclockwise) and is opposed in the opposite direction.

The inner housing includes at least one upwardly extending spline or lug at the top portion proximate to the periphery of the inner housing, and the flexible cover includes at least one downwardly extending element, preferably a clip for removably retaining the cover mounted to the top of the inner housing. The upwardly extending spline on the inner housing is in substantial radial alignment with the clip element extending downwardly from the bottom surface of the cover so that the clip element engages the spline so that the inner housing is rotatable with the cover when the cover is rotated relative to the outer housing.

In a further aspect of the present invention, supporting elements, preferably stop bosses, extend downwardly from a hub portion of the inner housing. The stop bosses are supported on an annular ledge portion defined by the outer housing. The stop bosses and the ledge are arranged to cooperate with each other for supporting the inner housing so that excessive strain is removed from the region at which the inner housing engages the outer housing. In this manner, deflection or displacement of the inner housing relative to the outer housing is reduced to assure that the openings in the inner and outer housings will remain in substantial alignment in the operational assembled state of the device.

In a still further aspect of the present invention, one or more openings are defined in the flexible cover of the device.

These openings are provided for receiving a tool, as for example a screwdriver or other instrument, for rotating the cover relative to the device, or for lifting or removing the cover from the device.

BRIEF DESCRIPTION OF THE DRAWINGS

FIG. 3 of the drawing is a top plan view of a peripheral flange extending around the top portion of the outer tube;

DESCRIPTION OF THE BEST MODES FOR CARRYING OUT THE INVENTION

Figure 1:
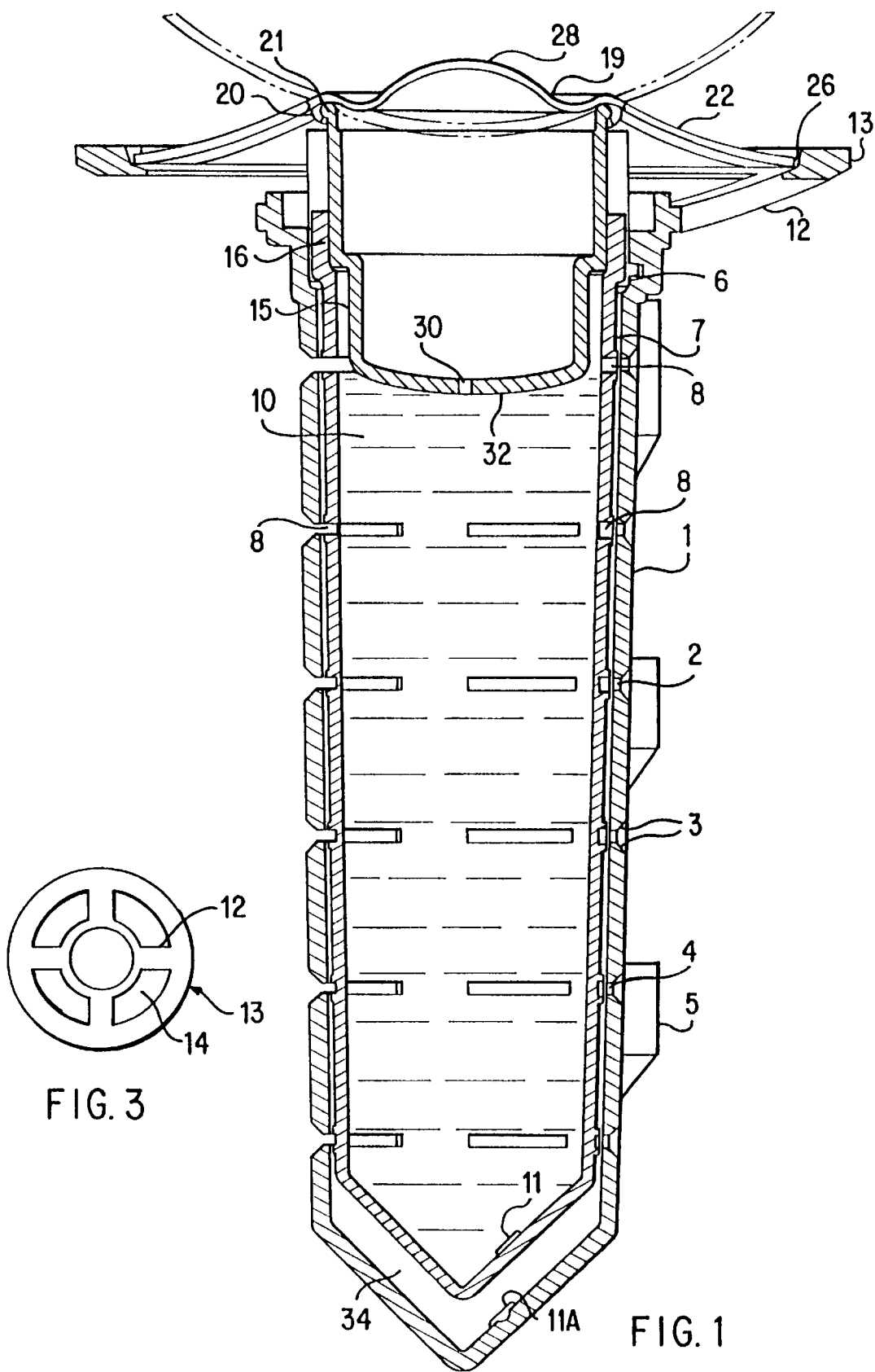
FIG. 1 of the drawing illustrates a sectional view of an earlier device for monitoring and controlling termites.

The device for monitoring and controlling in ground termite activity in accordance with the present invention will now be discussed with reference to FIGS. 1–13 of the drawing. FIGS. 1–6B illustrate the device disclosed in the aforementioned U.S. patent application Ser. No. 08/480,579. FIGS. 7–13 illustrate the modifications to the device disclosed in Ser. No. 08/480,579, in accordance with the present invention.

Figure 2:
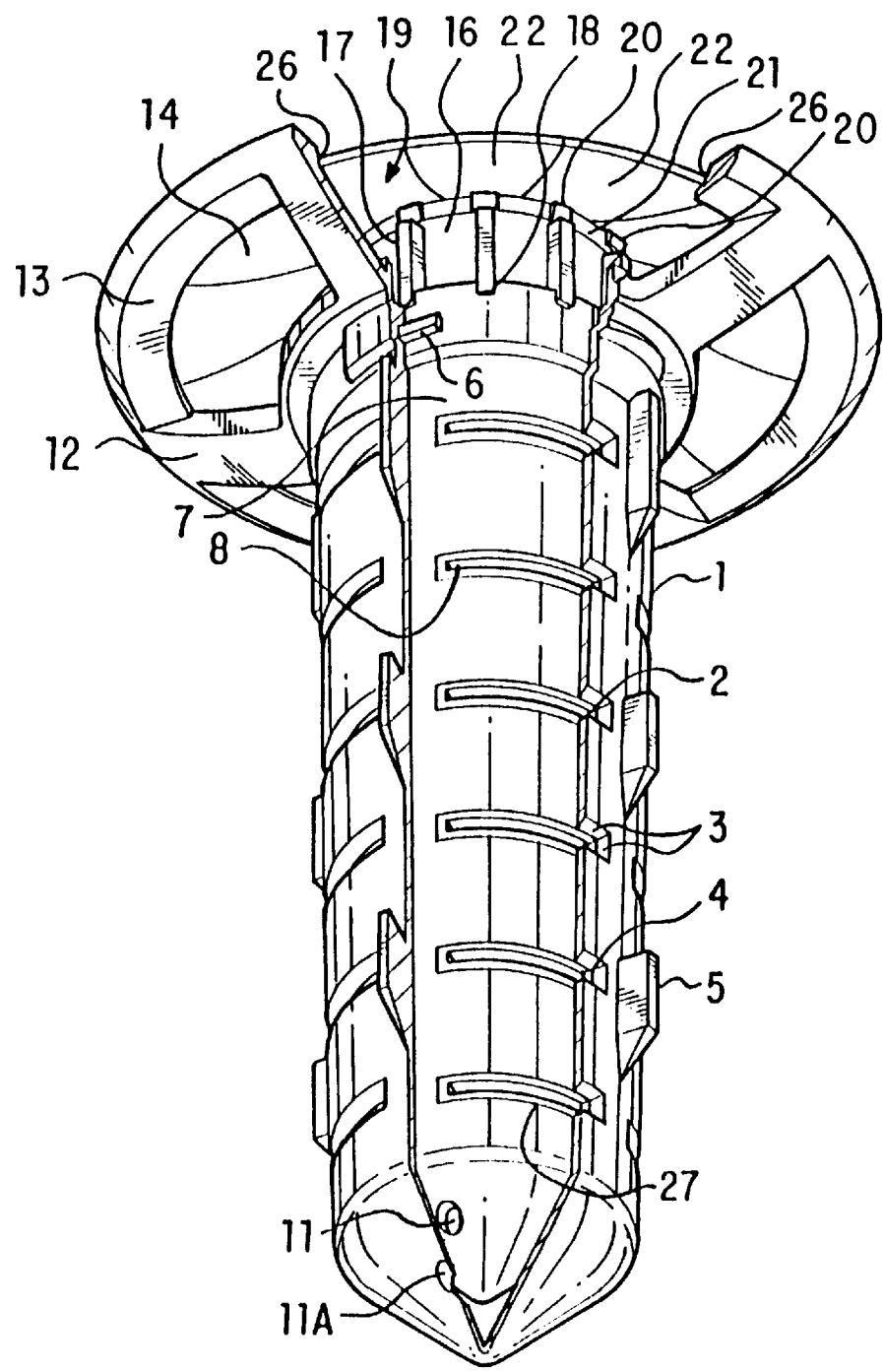
FIG. 2 of the drawing illustrates the device of FIG. 1, in perspective, further illustrating a section of an outer tube cut away to expose a corresponding section of an inner tube.

Referring first to FIGS. 1 and 2, an outer tubular housing is designated by the reference numeral 1 and an inner tubular housing is designated by the reference numeral 7. The inner tube is movable relative to the outer tube. As illustrated in FIGS. 1 and 2, the inner tube is removably received within the outer tube by a single lead thread designated by reference numeral 6. When the inner tube is rotated a maximum angular distance in a predetermined direction relative to the outer tube along the thread 6 on the inner tube, the device is in its operative position as shown in FIGS. 1 and 2 in which a plurality of entrance slots 2 having beveled guide edges 3 defined on the outer tube are in alignment with corresponding slots 8 defined in the inner tube 7 to define a narrow passageway designated by reference numeral 4 for guiding termites through the inner and outer tubes and into bait material 10 within the inner tube 7. The dimensions of the corresponding slots 2 and 8 defined on the outer and inner tubes are selected to permit termites to enter the inner tube and feed on the bait, but to exclude larger insects and animals from access to the bait material. The inner tube may be selectively removed from the outer tube by rotating the inner tube 7 along the single lead thread 6 defined thereon in the opposed predetermined direction until the inner tube disengages from the outer tube and may be lifted upwardly to be removed therefrom for inspection of termite activity in the bait material, and replenishment or replacement of the bait material. When the inner tube is reinstalled within the outer tube by relative rotation thereof a maximum angular distance in the proper predetermined direction, the respective slot 8 and 2 automatically realign to again define the continuous passageways 4 for providing access through the inner and outer tubes 7 and 1, respectively.

In operation of the device illustrated by FIGS. 1–2, the outer tubular housing 1 is permanently and fixedly implanted in ground. The pointed forward end of the outer tube facilitates the driving of the outer tube into the ground. As illustrated by FIGS. 1 and 2, a plurality of outwardly extending elements comprising generally wedge shaped protuberances 5 are mounted to the outer surface of the outer tubular housing 1 between columns of slots 2 also defined in the outer surface of the outer housing 1. Preferably, as illustrated in FIG. 2, the elements 5 extend outwardly in a radial orientation and are arranged along the outer surface of the outer tube in vertical columns which are spaced between the vertical columns of openings 2 also defined in the outer surface of the outer tubular housing 1. The radially extending wedge shaped elements 5 are provided to prevent rotation of the outer tubular housing 1 once it is implanted into the ground, and in particular, to deter rotation of the outer housing when the inner housing is rotated relative to the outer housing along the lead thread 6 for removing or for reinstalling the inner tubular housing 7 from and into the fixedly implanted outer tubular housing 1. As also illustrated in FIG. 2, the inner housing 7 defines a drainage opening 11 proximate to the lower end thereof and the outer tubular housing 1 defines a drainage opening 11A proximate to the lower end thereof and also proximate to the drainage opening 11 in the inner housing. In this manner, excess moisture accumulating within the inner bait housing 7 will be discharged from the device and will not accumulate therein.

Figure 4:
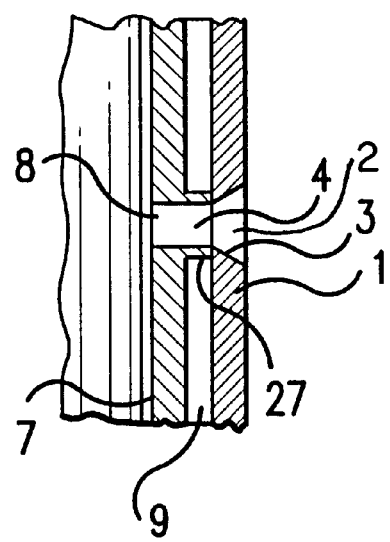
FIG. 4 of the drawing illustrates, in detail, a section of the inner tube abutting against the outer tube to align corresponding openings in the respective tubes.

FIG. 4 illustrates the detailed construction of the aligned openings 2 and 8 defined on the outer and inner tubes 1 and 7, respectively, to define one of the passageways 4 for providing access through the inner and outer tubes and into the inner bait tube. A boss 27, which is also illustrated in FIG. 2, is provided around the generally rectangular periphery of a slot 8 defined in the outer surface of the inner housing. The boss 27 abuts against the inner surface of the outer housing 1 to define a continuous passageway 4. As a result of the provision of the outwardly extending boss 27 around the slots 8 in the inner housing, a gap or space 9 is defined between the outer surface of the inner housing and the inner surface of the outer housing. The space 9 further insulates and protects the bait material within the inner tubular housing 7 from the ground and environmental conditions outside of the outer tubular housing 1.

Referring back to FIGS. 1 and 2, a ring or flange 13 is provided around the upper portion of outer housing 1. FIG. 3 illustrates a top plan view of the radially extending flange 13 which includes a plurality of radially oriented spoke segments 12 defining openings 14 therebetween. The openings 14 permit the introduction of dirt or sand to fill any gap between the outer surface of the outer housing 1 and the ground in which the device is implanted after the outer housing 1 is initially driven into the ground. The periphery of the flange 13 defines a recess 26, which, as will be discussed below, is provided to receive the edge of a removable flexible cover for the assembled implanted device.

Figure 5:
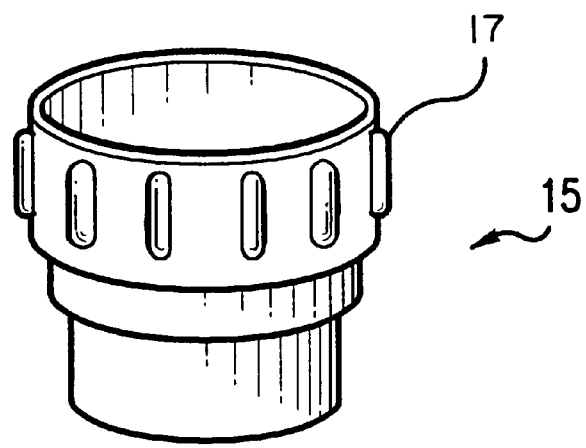
FIG. 5 of the drawing illustrates a perspective view of a metering cup received within the top of the inner tube as employed in the earlier device illustrated in FIGS. 1 and 2.

FIG. 5 illustrates a metering cup, generally designated by reference numeral 15, which is removably received in a friction fitting engagement in the opened top of the inner bait tube 7, as illustrated by FIGS. 1 and 2. The metering cup 15 defines a centrally disposed opening 30 in a bottom surface 32 thereof for allowing water to drip downwardly onto bait material 10 within the inner bait tube 7. Reference numeral 16 in FIGS. 1 and 2 generally illustrates the area in which the metering cup is removably friction fitted into the upper portion of the inner bait tube. As more clearly illustrated by FIG. 2, splines or lugs 17 extend outwardly from the periphery of the upper surface of the metering cup, and the lower portions of the splines are received in complementary recesses 18 defined in the upper portion of the inner bait tube 7 to permit the metering cup to securely nest within the inner bait tube in its removable friction fit engagement therewith. As a result of the removably locking engagement between the splines on the metering cup and the recesses in the bait tube, rotation of the metering cup relative to the outer tubular housing 1 also correspondingly causes rotation of the inner bait tube 7 relative to the outer tubular housing 1. Accordingly, rotation of the splines on the metering cup enables the removal or reinstallation of the inner tube from or into the outer tube for inspection and replacement of the bait material within the inner tube.

When the device is assembled as illustrated by FIGS. 1 and 2, the metering cup 15 is positioned above the bait material 10 within the inner bait housing 7. The opening 30 defined in the bottom surface 32 of the metering cup permits the appropriate quantity of water to drip from the metering cup downwardly onto the bait material 10 to actuate the bait material. As discussed above, drainage openings 11 and 11A defined in the bottom of the inner and outer housings 7 and 1 prevent excess water from accumulating within the device. Preferably, prior to actuation of the bait material by water dripping downwardly from the metering cup, the inner wall of the inner bait tube 7 is lined with dissolvable paper for temporarily sealing the slot 8 in the inner bait tube to prevent the bait material 10 from escaping through the slots during transporting, loading or implanting the device in ground. The release of water from the metering cup to moisten and actuate the bait material will also dissolve the paper covering the slots 8 to open the slots and permit access by termites to the bait material.

Figure 6A:
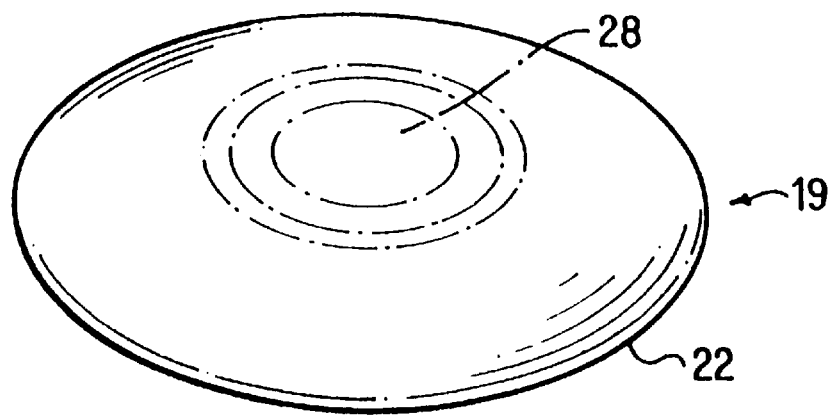
FIGS. 6A and 6B of the drawing illustrates in perspective, the top and bottom surfaces, respectively, of the flexible cover mounted atop the earlier device as illustrated in FIGS. 1 and 2.
Figure 6B:
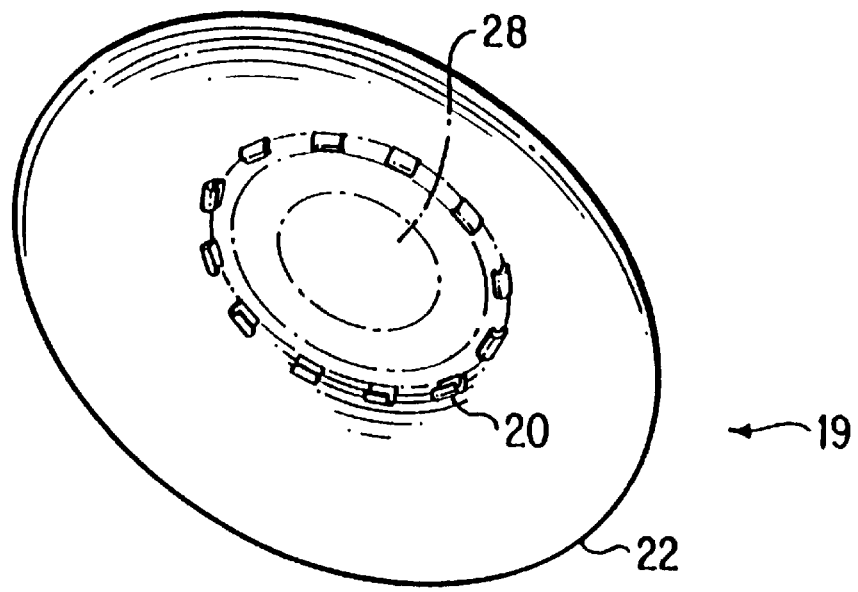

FIGS. 6A and 6B illustrates respectively, the top and lower surfaces of a flexible cover 19 mounted to the top of the assembled device as illustrated by FIGS. 1 and 2. The cover includes a centrally disposed portion 28, and a radially extending peripheral rim portion 22. A plurality of clip elements 20 are disposed around the outer surface of the central portion 28 of the cover 19. As illustrated most clearly by FIG. 2, the clips 20 engage a peripheral rim 21 of the metering cup 15 for releasably securing the central portion 28 of the cover 19 to the top of the metering cup 15. As also illustrated by FIGS. 1 and 2, the outer edge portion of the rim 22 of the flexible cover 19 is engaged and retained in a recess 26 defined by the flange 13 extending outwardly around the top portion of the outer tubular housing 1. When the flexible cap 19 is mounted atop the assembled device as illustrated by FIG. 1 and 2, the central portion 28 of the cover 19 closes the opened top of the metering cup 15, and the peripheral portion 22 of the flexible cover 19 covers the top of the outer tubular housing 1 including the opened areas 14 defined between the radially extending ribs 12 of the flange 13.

In its assembled, operational in ground state, the central portion of the flexible cover 19 is flexed upwardly to define a dome-shaped configuration as illustrated by FIG. 1. When the device is to be disassembled and the inner tube is to be removed from the outer tube, the central portion of the cover 19 is depressed downwardly, causing the peripheral rim portion 22 of the cover to extend upwardly, as illustrated in phantom in FIG. 1. By raising the rim portion 22, access is provided to the lugs 17 of the metering cup, which, as discussed above, enables rotation of the metering cup and the attached inner bait housing for removing the inner housing from the outer housing.

The cover 19 may be formed from any conventional resilient material to permit it to flex between its opened and closed positions as illustrated by FIG. 1. The arrangement by which the holding clips or locking elements 20 extend downwardly from the lower surface of the cover and snap over the rim 21 of the metering cup, and the arrangement by which the peripheral edge of the outer flange portion 22 of the cover is removably received within the recess 26 defined in the flange 13 extending radially from the outer tubular housing 1, enables the cover to rotate relative to the metering cup and the outer housing, without inadvertently disengaging therefrom. As discussed, removal of the cover requires the application of a downward force to the central portion 28, and therefore rotational movement by itself will not disengage the cover.

In operation of the device illustrated by FIGS. 1–6, the outer tubular housing 1 is driven in ground at a pre-selected location. The pointed forward end of the outer housing facilitates the implantation thereof into the terrain to be monitored. The housing is driven to a depth such that the radially extending flange 13 is substantially at ground level. The inner bait tube 7, which has been pre-loaded with bait material in the manner discussed above, is received within the implanted outer housing, and is removably secured thereto by rotation of the inner housing relative to the outer housing in a predetermined direction along the thread 6. As discussed above, the inner bait tube is rotated relative to the outer housing by inserting the metering cup 15 into the opened top end of the inner tube such that the lugs 17 extending downwardly from the periphery of the metering cup engage complementary recesses 18 defined in the upper sidewall portion of the inner bait tube. In this manner, rotation of the metering cup by engaging the lugs 17 also results in rotation of the inner bait tube relative to the outer housing. The outer housing remains fixedly implanted in the ground and does not rotate as a result of the anti-rotation elements 5 extending outwardly from the outer housing in a radial direction. Additional soil may be deposited through open areas 14 of the upper flange 13 for closing any gap or space between the outer surface of the outer tube and the surrounding terrain. In this manner, the slot or openings 2 defined in the outer surface of the outer housing abut against the surrounding terrain to enable termites to forage directly through the terrain and into the slots 2.

After the inner and outer tubes and the metering cups have been implanted into the ground, the center portion of the flexible cover 19 is snapped over the rim of the metering cup and the peripheral edge of the cover is received within the recess defined in the flange 13 extending radially outwardly from the upper portion of the outer housing. Water in the metering cup 15 is now permitted to drip downwardly onto the bait material 10 in quantities controlled by the opening 30 defined in the bottom surface 32 of the metering cup. The bait material 10 is activated by mixing with the downwardly dripping water. Any excess accumulation of water in the inner housing 7 is drained through discharge opening 11 into the space 34 defined between the inner housing 7 and the outer housing 1. Water within the space 34 is subsequently drained into the surrounding terrain through discharge opening 11A. Accordingly, accumulation of excess water within the assembled device is controlled through the respective drainage openings 11 and 11A defined on the inner and outer housings.

When it is desired to remove the inner tube from the outer tube for inspection, replacement, or general maintenance, the procedure described above is reversed. A downward force is exerted on the upwardly extending, central dome portion 28 of the cover 19, raising the peripheral flange portion 22 of the cover 19 as illustrated in phantom by FIG. 1. The raised portion 22 provides access to the lugs 17 on the metering cup for rotation thereof (as for example, by an appropriate tool), thereby causing the inner bait tube to rotate relative to the outer housing along thread 6 in a direction which disengages or uncouples the inner tube from the outer housing. The outer housing remains fixedly implanted in the terrain as a result of the outwardly extending radial elements 5. The inner tube is now removed from the outer tube, the metering cup is disengaged from the inner tube, and the bait material within the inner tube may be inspected for termite activity. The bait material may be replaced before the inner tube is reinstalled within the outer housing. Since the reinstallation procedure requires rotation of the inner housing relative to the outer housing a maximum angular distance along the lead thread 6, the openings 8 defined in the sidewall of the inner housing will be automatically re-aligned with the openings 2 defined in the sidewall of the outer housing to re-establish the passageways 4, merely by rotating the inner bait tube.

FIGS. 7–13 illustrate modifications to the termite device discussed herein and illustrated by FIGS. 1–6, in accordance with the present invention. A first major modification to the earlier device of FIGS. 1–6 is the elimination of the metering cup. Accordingly, the modified device includes only three major components, namely the inner housing, the outer housing and the removable cover. The following description of FIGS. 7–13 employs the same reference numerals for all corresponding elements illustrated in FIGS. 1–6.

Figure 7:
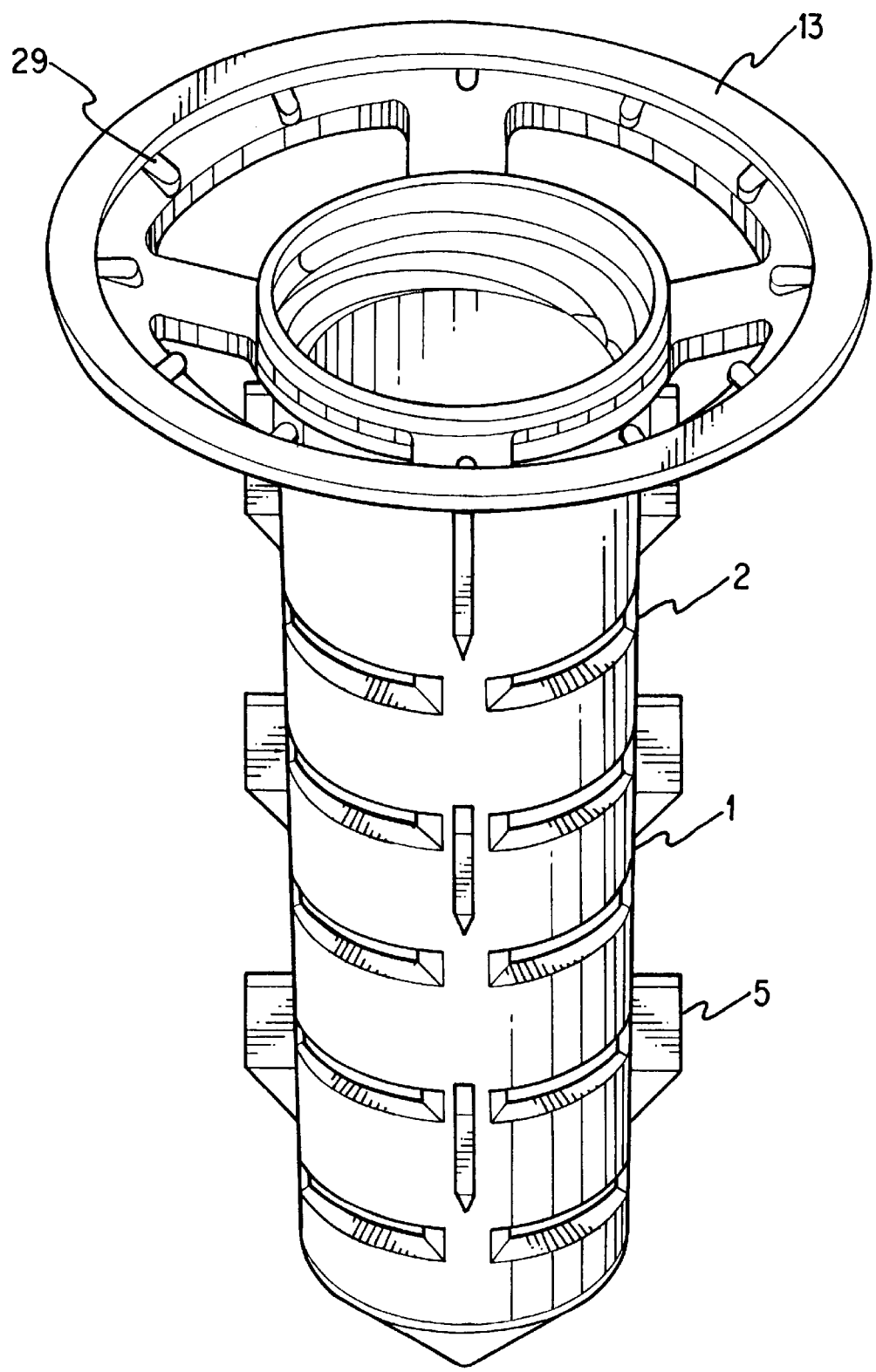
FIG. 7 is a perspective view of the outer housing of the device of FIGS. 1–6, modified in accordance with the present invention.
Figure 9:
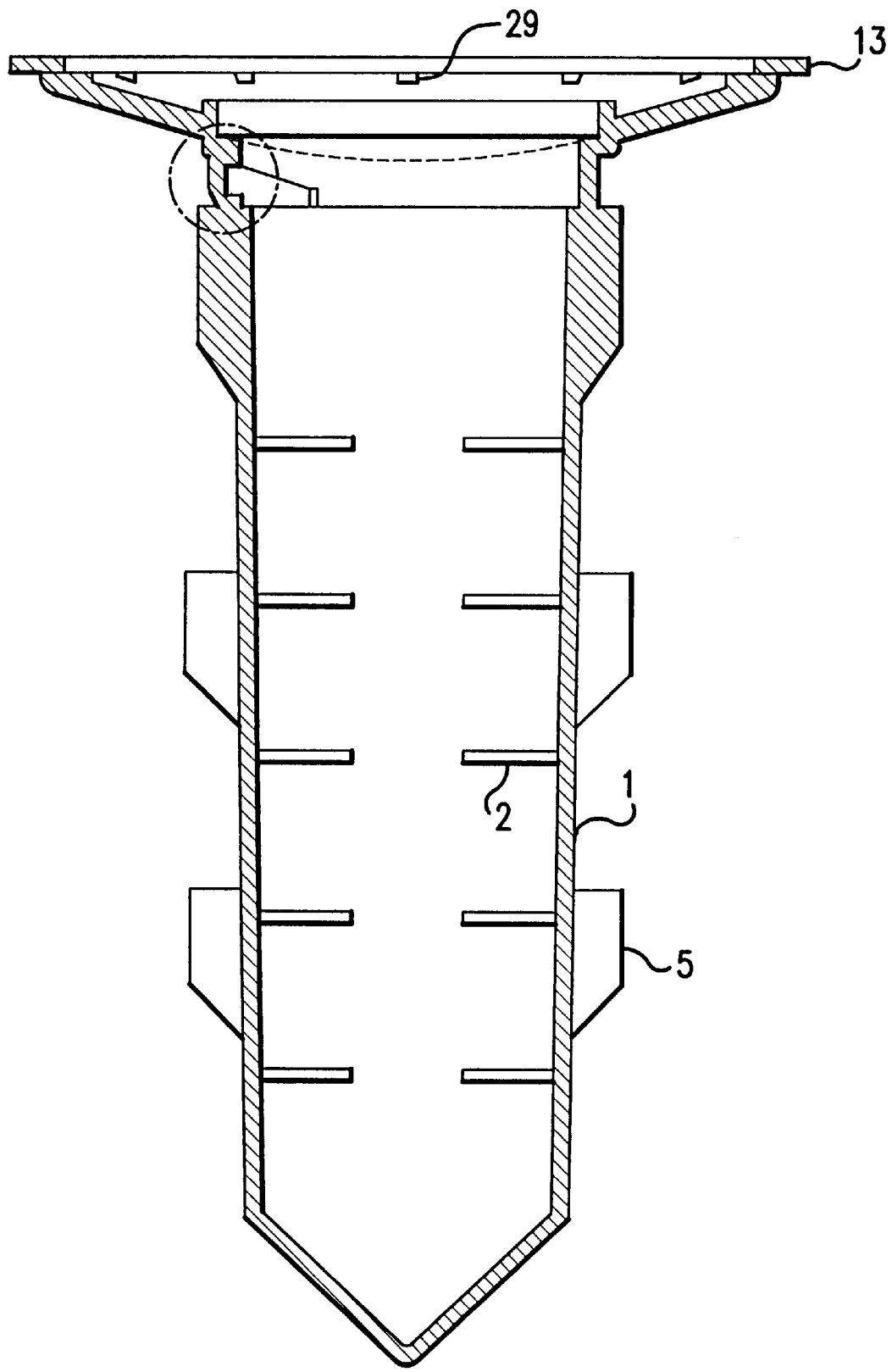
FIG. 9 is an elevational view, in section, illustrating the inner housing of FIG. 8 received within the outer housing of FIG. 7.
Figure 10:
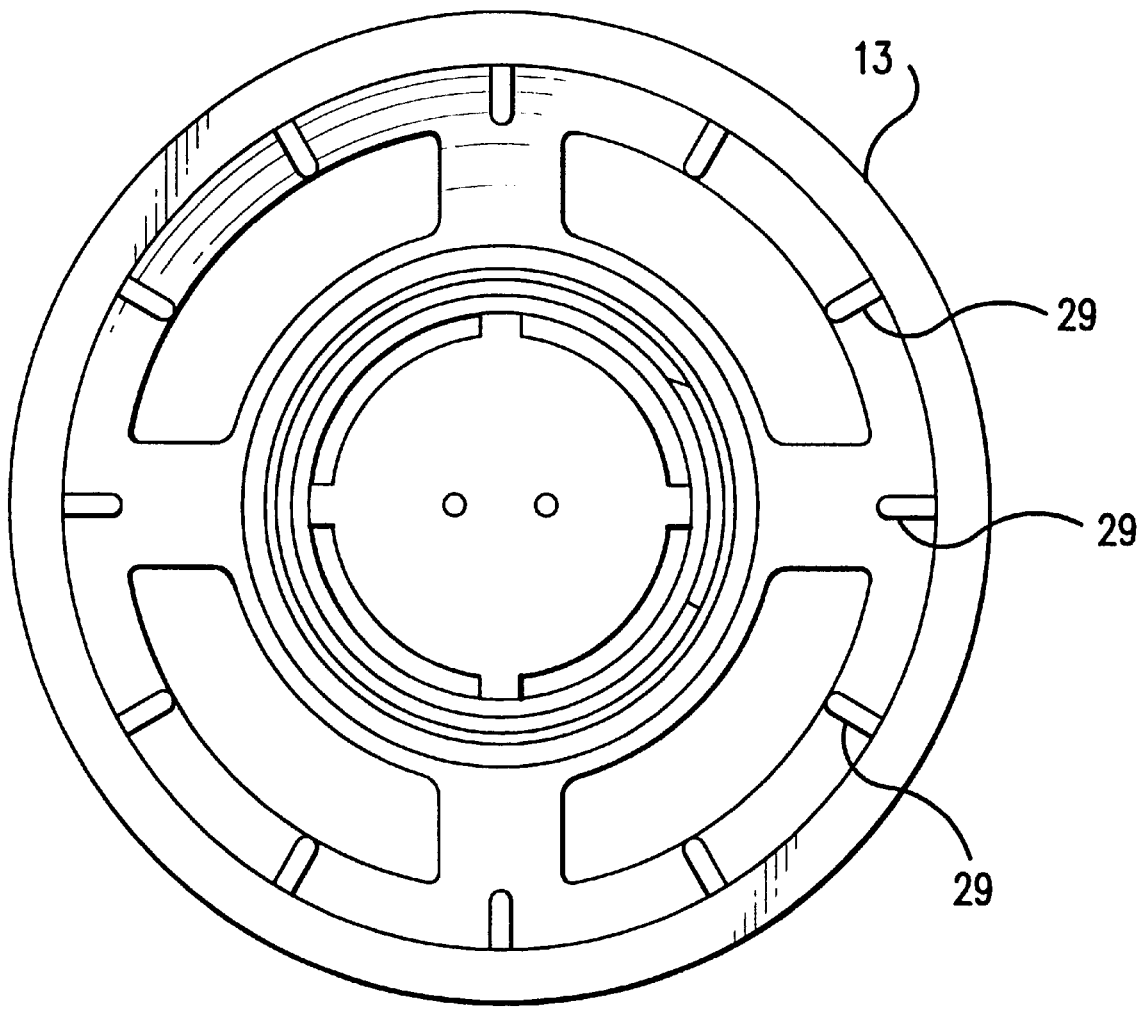
FIG. 10 is a top plan view of the inner housing illustrated by FIG. 7 received within the outer housing illustrated by FIG. 8, in accordance with the modified device of the present invention.

Referring to FIGS. 7, 9 and 10 of the drawing, a plurality of ribs 29 are shown extending upwardly from the peripheral region of flange 13 of the outer housing 1. As discussed with respect to FIGS. 1–6, the outer housing includes openings 2 defined in the sidewall thereof, and further includes wedge shaped protuberances 5 extending radially outwardly from different areas along the outer sidewall of the outer housing.

Figure 8:
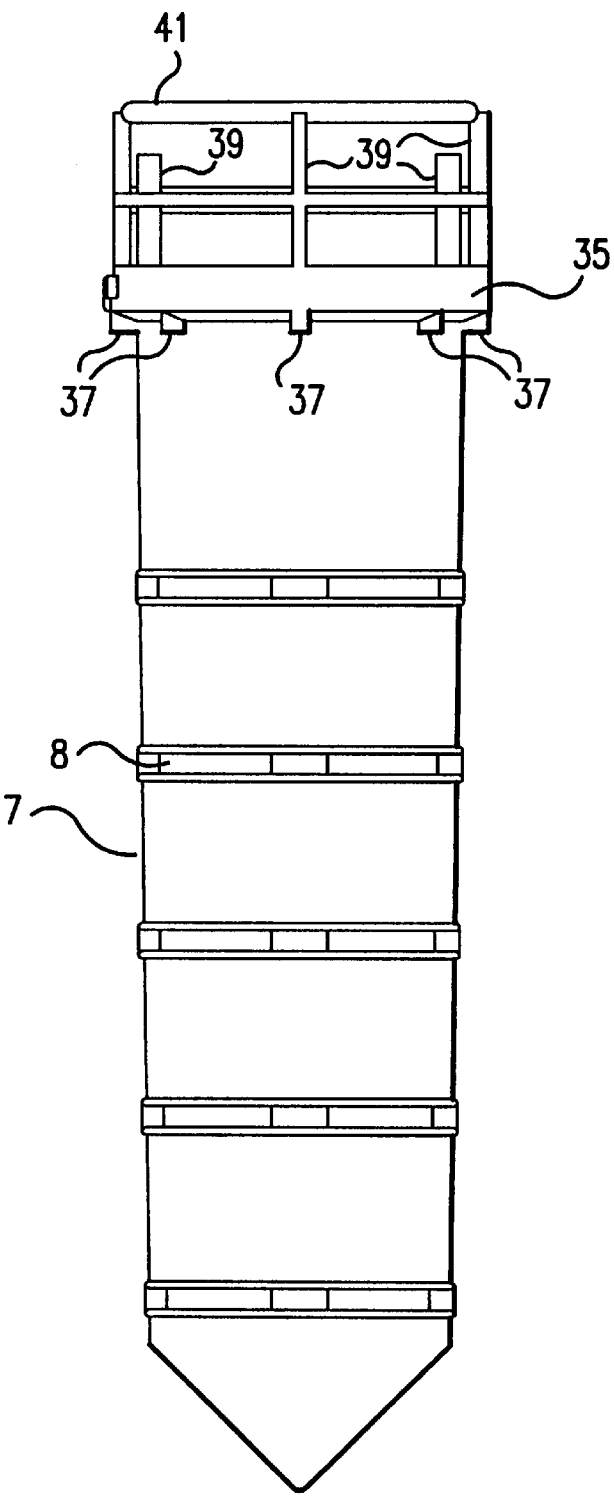
FIG. 8 is an elevational view, partly in section, of an inner housing in accordance with the modified device of the present invention.

FIG. 8 illustrates the inner housing 7, which, as discussed with respect to FIGS. 1–6, defines a plurality of openings 8 in the outer surface thereof which are moved into alignment with the openings 2 in the outer housing when the device is assembled into its operating position. FIG. 8 further illustrates that the inner housing 7 includes a hub 35 proximate to the top thereof, and a plurality of supporting elements or stop bosses 37—which—extend downwardly from the bottom surface of the hub 35. A plurality of splines or lugs 39 extend upwardly in a substantially perpendicular orientation from the hub 35. The splines 39 extend towards the top rim 41 of the inner housing 7.

Figure 11:
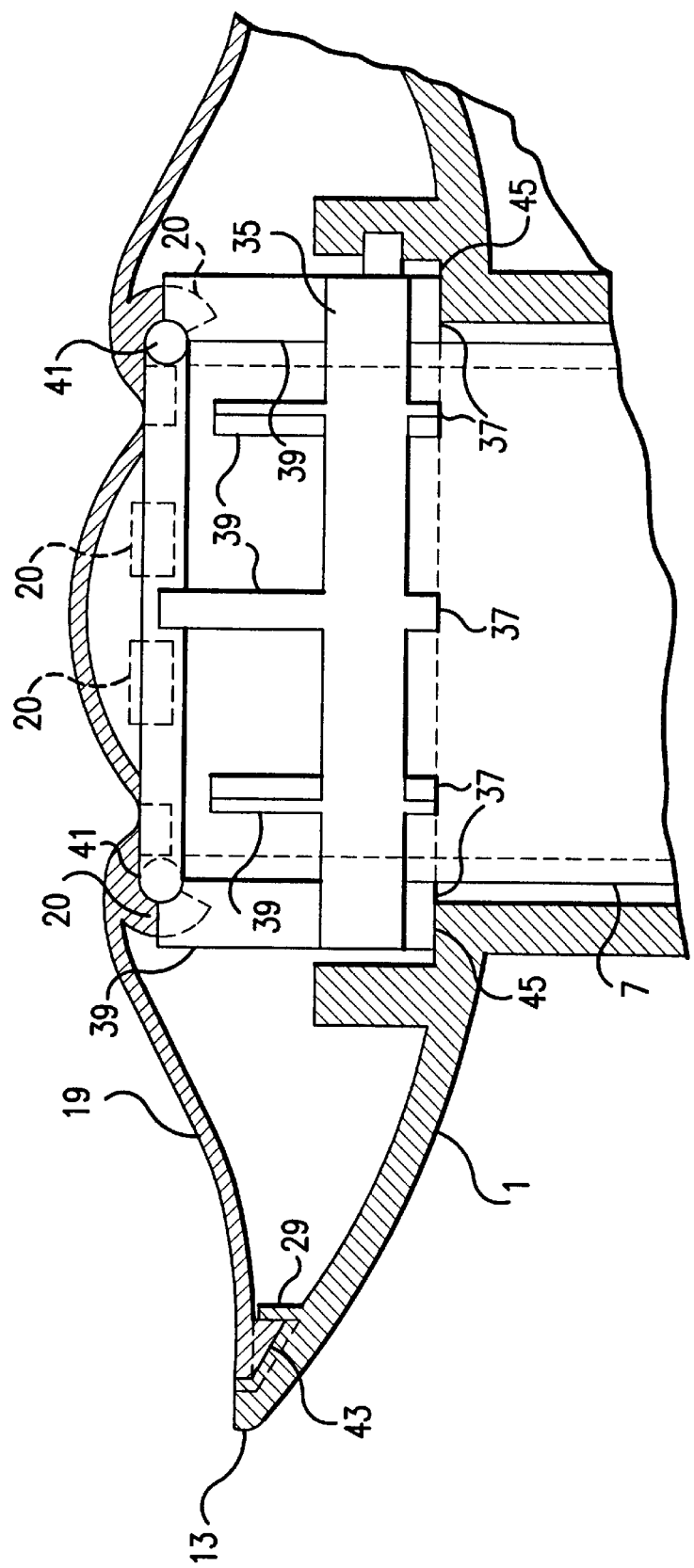
FIG. 11 is a side elevational view, in section, of the upper portion of the modified device of the present invention illustrating the operative relationship between the inner and outer housings of the modified device and a flexible cover mounted over the assembled device.

FIG. 9 shows the inner housing 7, illustrated by FIG. 8, received within the outer housing 1, illustrated by FIG. 7, when the device is in its assembled, operative position. FIG. 11 provides a detailed illustration of the relationship between the structure of the inner housing 7 and the outer housing 1 in the operative position of the device shown by FIG. 9. Referring now to FIG. 11, the flexible cover 19 is shown mounted over the top of the assembled device. One of the ribs 29 extending upwardly from the peripheral flange 13 of the outer housing 1 abuts against the underside of the peripheral region of the cover 19 to provide structural support for the cover and prevent undesirable flexing. An element 43, extending downwardly from the underside of the cover 19 proximate to the periphery of the cover and in substantial radial alignment with the rib 29, operatively cooperates with the rib to oppose relative rotation of the cover 19 in a predetermined direction, as will be discussed in greater detail below.

Still referring to FIG. 11, the flexible cover 19 includes a clip 20 which removably engages the rim 41 defined on the top of the inner housing 7 so as to removably mount the central portion of the cover 19 over the opened top portion of the inner housing 7. The cover 19 is rotatable relative to the inner housing 7 along the top of the inner housing as a result of the operative engagement of the clip elements 20 extending downwardly from the bottom surface of the cover 19 and the top rim 41 of the inner housing. The cover 19 is also rotatable relative to the outer housing 1, subject to the operative relationship between the ribs 29 extending upwardly from the flange portion 13 of the outer housing and the elements 43 extending downwardly from the bottom surface of the cover 19 in substantial radial alignment with the ribs.

Still referring to FIG. 11, when the inner housing 7 is received within the outer housing 8, the stop elements 37 extending downwardly from the hub 35 of the inner housing are supported on an annular ledge 45 defined internally within the outer housing 1. The elements 37 and the ledge 45 are arranged to cooperate with each other to provide enhanced structural support of the inner housing received within the outer housing to eliminate undue stress in the area at which the inner housing engages the outer housing (as discussed with respect to FIGS. 1–6, preferably the inner and outer housings are removably engaged by threading, preferably by a single thread). By reducing the structural stress in the region at which the inner and outer housings are in engagement, any flexing or displacement of the inner housing relative to the outer housing as a result of structural fatigue, is reduced or eliminated. The reduction or elimination of such undesired relative displacement assures that the openings 2 and 8 in the inner and outer housings, respectively, will be maintained in substantial alignment when the inner housing is rotated relative to the outer housing in the operative position of the device, as discussed in greater detail with respect to FIGS. 1–6.

The clip elements 20, extending downwardly from the bottom surface of the cover 19, engage the upper rim 41 of the inner tube 7 to permit the cover 19 to be removably mounted over the top of the inner housing, and to permit the cover to be rotated relative to the inner housing. The splines or lugs 39 extending upwardly from the hub 35 of the inner housing are arranged so as to be disposed between adjacent clip elements 20 and oriented in substantial radial alignment with the clips. As a result of this operative arrangement between the splines 39 and the clips 20, as the cover 19 is rotated relative to the inner housing 7, the clip elements 20 carried by the rotating cover will engage the spline elements 39 so that the cover and the inner housing are rotatable together relative to the fixed outer housing 1. However, as will now be discussed with respect to FIG. 13, the conjoint movement of the cover and the inner housing relative to the fixed outer housing is controlled, to a limited extent, by the relationship between the cooperating ribs 29 and elements 43 carried, respectively, by the outer housing and the cover.

Figure 13:
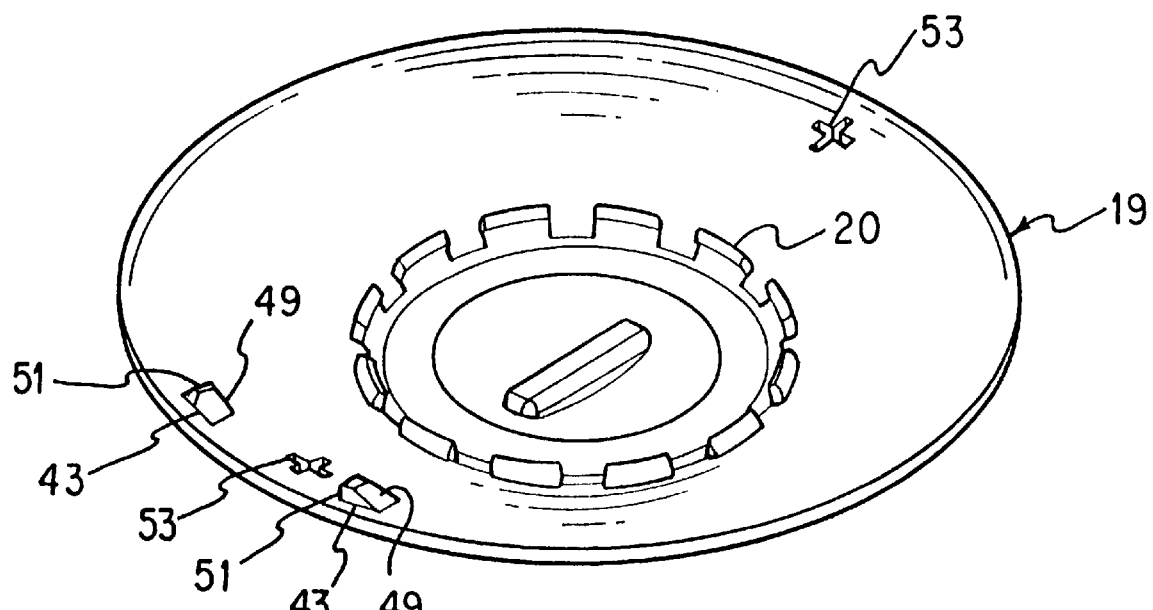
FIG. 13 illustrates a perspective view of the bottom surface of the flexible cover illustrated by FIG. 12 showing further modifications to the cover in accordance with the present invention.

Referring to FIG. 13, this drawing illustrates the bottom surface of the flexible cover 19 as shown in FIG. 11. A plurality of elements 43 extend downwardly from the bottom surface of the cover, proximate to the periphery thereof. As discussed with respect to FIG. 11, the elements 43 are carried by the cover so as to be in substantial radial alignment with the ribs 29 extending upwardly from the peripheral flange 13 of the outer housing 1. A first end of each element 43 defines an inclined surface 49, and the opposed end 51 of each element 43 is oriented in a plane substantially perpendicular to the bottom surface of the cover. When the cover is rotated relative to the inner housing in a direction in which the inclined surfaces 49 of the elements 43 are the leading ends, the inclined surfaces ride over the ribs 29 on the fixed outer housing to permit unimpeded rotation of the cover relative to the fixed outer housing. As discussed above, as the cover rotates relative to the outer housing, the clip elements 20 carried on the bottom surface of the cover engage the splines 37 of the inner housing to permit conjoint rotation of the cover and inner housing relative to the fixed outer housing. However, when the cover 19 is rotated relative to the outer housing in the opposite direction such that the perpendicularly oriented ends 51 of elements 43 are the leadings ends, the elements 43 engage the fixed ribs 29 on the fixed outer housing which act as stops.

Accordingly, any further rotation of the cover relative to the outer housing in the later direction, and thus any conjoint rotation of the cover and the inner housing relative to the outer housing, is opposed by the engagement of the perpendicular ends 51 of elements 43 with the fixed ribs 29. Rotation of the cover (and conjoint rotation of the cover and the inner housing) relative to the fixed outer housing is only possible in this later direction, (i.e., the direction of relative rotation when the perpendicular ends 51 of elements 43 are the leading ends) by lifting the cover so that the elements 43 are raised above the fixed ribs 29 carried by the outer housing 1.

Preferably, the elements 43 and the ribs 29 are arranged such that the cover is freely rotatable relative to the outer housing in a direction in which the inner housing is rotated to engage the outer housing to assemble the device into its operative position. In this manner, the operative relationship between the elements 43 and the ribs 29 will oppose rotation of the cover in a direction which will remove the inner housing from the outer housing. In order to rotate the cover in a direction to remove the inner housing from the outer housing, it will be necessary to raise the periphery of the cover so that the elements 43 carried on the bottom surface thereof are elevated above the ribs 29 during rotation of the cover. This operation will generally require the use of a tool. The operative relationship between the cover and the outer housing by which the cover is freely rotatable only in the direction of engagement of the inner housing within the outer housing, but requires additional steps, manipulations, and tools to rotate the cover to remove the inner housing from the outer housing, is advantageous from a safety perspective in that it tends to prevent unauthorized personnel, and in particular children, from gaining access to the materials within the inner housing by removing the inner housing from the implanted outer housing.

Figure 12:
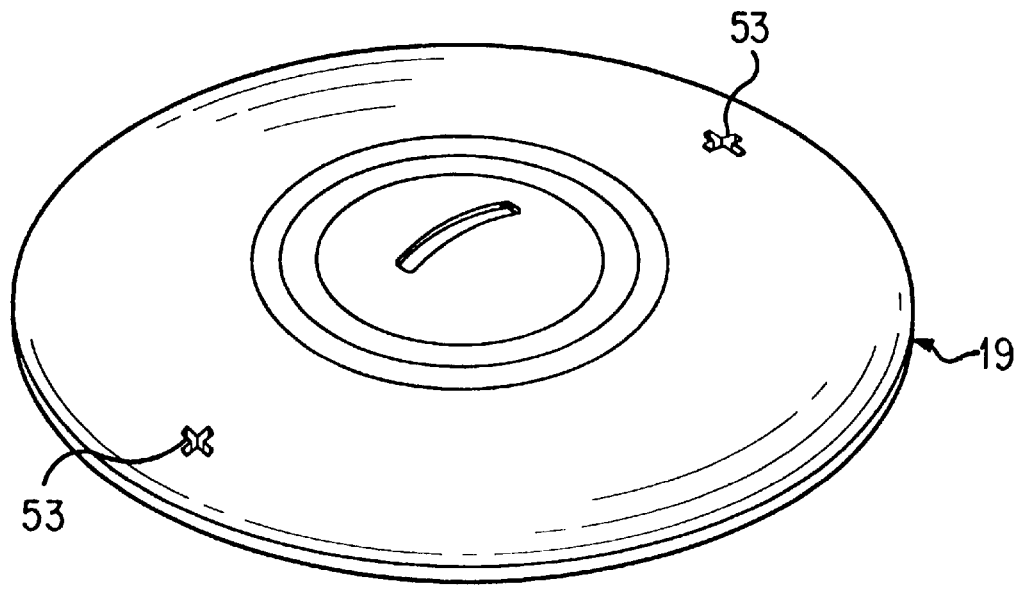
FIG. 12 illustrates a perspective view of the top surface of the flexible cover for the device modified in accordance with the present invention.

FIG. 12 of the drawing illustrates the top surface of the cover 19, showing two openings 53 defined in the cover. These openings are also illustrated in FIG. 13. The openings 53 are provided so that a screwdriver or other tool can be inserted therein for both rotating the flexible cover relative to the outer housing, and for raising the peripheral portion of the flexible cover so that the elements 43 carried on the bottom surface of the cover can be raised above the fixed ribs carried on the outer housing as discussed with respect to FIG. 13.

Other modifications within the scope of the present invention will become apparent to those skilled in the art. For example, although the inner and outer housings are illustrated as being tubular in configuration and each define a pointed bottom end surface, other configurations of the inner and outer tube can also be employed in the practice of the present invention. Additionally, although the openings in the inner and outer tubes have been illustrated as slots having a generally rectangular configuration, other configurations of the openings can be employed in the practice of the present invention. Preferably, the inner and outer housings are formed from conventional, lightweight durable material, as for example, suitable plastics. The removable top cover is likewise formed from a durable, flexible material.

The description of the best modes for carrying out the invention discussed herein is intended to be illustrative only, and not restrictive of the scope of the invention, that scope being defined by the following claims and all equivalents thereto.

I claim:

1. A device for detecting and controlling termite activity, said device comprising:

an outer housing adapted to be fixedly implanted in the ground; an inner housing removably receivable within said outer housing; means for moving said inner housing relative to said outer housing such that at least one opening in said inner housing is at least partially aligned with at least one opening in said outer housing;

said device including a cover removably mountable over said inner and said outer housings when said inner housing is received in said outer housing; said cover being mounted to said device for rotation relative to said outer housing; and first means on said cover for selectively rotating said cover conjointly with said inner housing relative to said outer housing.

2. A device for detecting and controlling termite activity, said device comprising:

an outer housing adapted to be fixedly implanted in the ground; an inner housing removably receivable within said outer housing; means for moving said inner housing relative to said outer housing such that at least one opening in said inner housing is at least partially aligned with at least one opening in said outer housing;

said device including a cover removably mountable over said inner housing and said outer housing when said inner housing is received in said outer housing;

said cover being mounted to said device for rotation relative to said outer housing first means on said cover for selectively rotating said cover conjointly with said inner housing relative to said outer housing;

stop means carried on said outer housing, and second means on said cover cooperating with said stop means on said outer housing for opposing rotation of said cover relative to said outer housing in a first predetermined direction.

3. The device as claimed in claim 2 wherein said cover is formed from a flexible material.

4. The device as claimed in claim 2 further including means for overriding said stop means on said outer housing to allow rotation of said cover relative to said outer housing in said first predetermined direction.

5. The device as claimed in claim 4 wherein said means for overriding said stop means on said outer housing includes means for elevating said second means on said cover cooperating with said stop means above said stop means simultaneously with the rotation of said cover relative to said outer housing in said first predetermined direction.

6. The device as claimed in claim 2 wherein said inner housing includes at least one spline, said first means on said cover being arranged to engage said spline for rotating said cover conjointly with said inner housing relative to said outer housing.

7. The device as claimed in claim 6 wherein said cover is rotatably mounted to said device by said first-means on said cover for rotating said cover conjointly with said inner housing relative to said outer housing.

8. The device as claimed in claim 6 wherein said inner housing includes a hub, said at least one spline extending upwardly from said hub.

9. The device as claimed in claim 2 wherein said second means on said cover cooperating with said stop means on said outer housing includes at least one element extending downwardly from a bottom surface of said cover; said at least one element including a first end having an inclined surface relative to said bottom surface of said cover, and a second end having a surface oriented substantially perpendicular to said bottom surface of said cover.

10. The device as claimed in claim 2 wherein said cover defines at least one opening therein adapted to receive a tool.

11. A device for detecting and controlling termite activity, said device comprising:

an outer housing adapted to be fixedly implanted in the ground; an inner housing removably receivable within said outer housing; means for moving said inner housing relative to said outer housing such that at least one opening in said inner housing is at least partially aligned with at least one opening in said outer housing;

a cover removably mountable over said device when said inner housing is received within said outer housing; said outer housing having a flange at the periphery thereof; and at least one rib extending upwardly from said flange for supporting the peripheral region of said cover;

means on said cover for selectively rotating said cover relative to said outer housing when said cover is mounted to said device;

said cover including means for cooperating with said at least one rib on said flange of said outer housing for opposing rotation of said cover relative to said outer housing in a predetermined direction;

said cover including means for engaging said inner housing for conjoint rotatable movement of said cover and said inner housing relative to said outer housing.

12. The device as claimed in claim 11 including means for overriding said means for opposing rotation of said cover relative to said outer housing to allow rotation of said cover relative to said outer housing in said predetermined direction.

13. A device for detecting and controlling termite activity, said device comprising:

an outer housing adapted to be fixedly implanted in the ground; an inner housing removably receivable within said outer housing; means for moving said inner housing relative to said outer housing such that at least one opening in said inner housing is at least partially aligned with at least one opening in said outer housing;

a flexible cover removably mountable over said device when said inner housing is received within said outer housing; said outer housing having a flange at the periphery thereof, and at least one rib extending upwardly from said flange for supporting the peripheral region of said flexible cover;

means on said cover for selectively rotating said cover relative to said outer housing when said cover is mounted to said device;

said cover including means cooperating with said at least one rib on said flange of said outer housing for opposing rotation of said cover relative to said outer housing in a predetermined direction;

said cover including means for engaging said inner housing for conjoint rotatable movement of said cover and said inner housing relative to said outer housing.

14. The device as claimed in claim 13 wherein said cover defines at least one opening therein, said opening adapted to receive a tool for rotating said cover relative to said outer housing.

15. The device as claimed in claim 13 wherein said inner housing includes at least one spline, and said means on said cover for engaging said inner housing is arranged to engage said at least one spline.

16. The device as claimed in claim 13 wherein said means on said cover for selectively rotating said cover relative to said outer housing comprises said means for engaging said inner housing.

17. The device as claimed in claim 13 including means for overriding said means for opposing rotation of said cover relative to said outer housing to allow rotation of said cover relative to said outer housing in said predetermined direction.

18. A device for detecting and controlling termite activity, said device comprising:

an outer housing adapted to be fixedly implanted in the ground; an inner housing removably receivable within said outer housing; means for moving said inner housing relative to said outer housing such that at least one opening in said inner housing is at least partially aligned with at least one opening in said outer housing;

said device including a cover removably mountable over said inner housing and said outer housing when said inner housing is received in said outer housing;

said cover being mounted to said device for rotation relative to said outer housing;

first means on said cover for selectively rotating said cover conjointly with said inner housing relative to said outer housing;

said inner housing including at least one spline, said first means on said cover being arranged to engage said spline for rotating said cover conjointly with said inner housing relative to said outer housing, said inner housing including a hub, said at least one spline extending upwardly from said hub, said hub carrying at least one supporting element extending downwardly therefrom, said outer housing defining a ledge thereon, said hub and said ledge being arranged such that at least one supporting element is seated on said ledge when said inner housing is received within said outer housing.

* * * * *